United States Patent [19]

Suslick

[11] 4,010,100
[45] Mar. 1, 1977

[54] ISOTOPE SEPARATION BY PHOTOCHROMATOGRAPHY

[75] Inventor: Kenneth S. Suslick, Stanford, Calif.

[73] Assignee: The United States of America as represented by the United States Energy Research and Development Administration, Washington, D.C.

[22] Filed: Oct. 3, 1975

[21] Appl. No.: 619,156

[52] U.S. Cl. .................................. 55/67; 55/68
[51] Int. Cl.$^2$ ................................. B01D 15/08
[58] Field of Search ............ 55/62, 67, 68, 74, 196, 55/197, 208

[56] References Cited

UNITED STATES PATENTS

| 2,863,526 | 12/1958 | Salmon | 55/68 |
| 3,488,921 | 1/1970 | Inchausne | 55/67 X |
| 3,608,273 | 9/1971 | Fabuss et al. | 55/208 X |
| 3,891,413 | 6/1975 | Sievers | 55/67 |

FOREIGN PATENTS OR APPLICATIONS

| 2,312,194 | 10/1973 | Germany | 55/66 |

OTHER PUBLICATIONS

O. Pringer, "Gas Chromatic Separation of Hydrogen Isotopes on Glass Powder", Column Chromatogr., Int. Symp.Separ. Methods, 5th, 1969(Pub.1970), 233 (Ger), as abstracted in Chem. Abstracts 76:53546$h$, (1972) p. 538.

L. H. Little, Infrared Spectra of Adsorbed Species, Academic Press, New York, 1966 pp. 297–308.

C. Bradley Moore, "The Application of Lasers to Isotope Separations", Accounts of Chemical Research 6 323 (1973).

E. Heftmann, Chromatography, Reinhold Pub. Co., New York, pp. 656–660, "Isotope Separation" (1966).

Primary Examiner—John Adee
Attorney, Agent, or Firm—Dean E. Carlson; Roger S. Gaither; Irene S. Croft

[57] ABSTRACT

An isotope separation method which comprises physically adsorbing an isotopically mixed molecular species on an adsorptive surface and irradiating the adsorbed molecules with radiation of a predetermined wavelength which will selectively excite a desired isotopic species. Sufficient energy is transferred to the excited molecules to desorb them from the surface and thereby separate them from the unexcited undesired isotopic species. The method is particularly applicable to the separation of hydrogen isotopes.

8 Claims, 1 Drawing Figure

FEED GAS

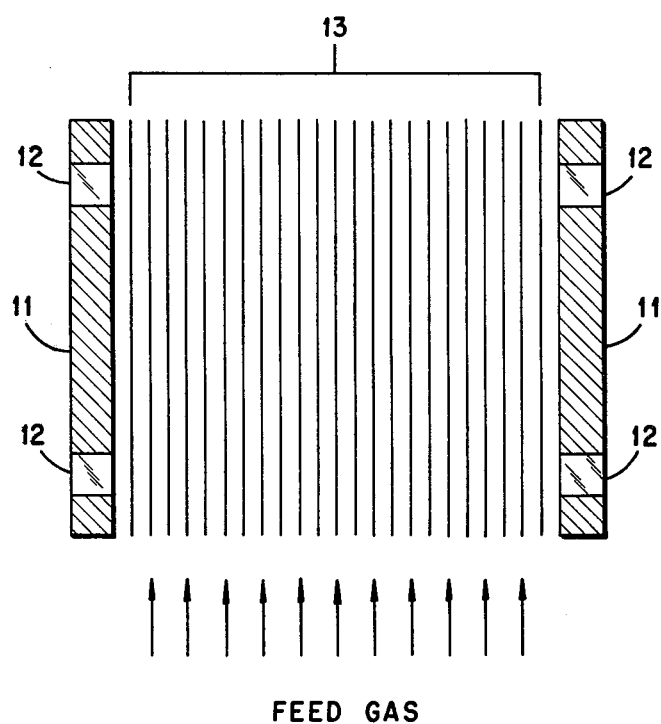

ISOTOPE SEPARATION BY PHOTOCHROMATOGRAPHY

BACKGROUND OF THE INVENTION

The invention described herein was made in the course of, or under, United States Energy Research and Development Administration Contract No. W-7405-ENG-48 with the University of California.

This invention relates to isotope separation processes. More particularly, this invention relates to a method of isotope separation by photochromatography.

Several processes for isotope separation make use of the so-called "isotope shift", that is, a slight shift of the lines in the absorption spectra of elements or molecular species due to the small difference in nuclear mass of the isotopes of the same element. A common feature of all separation methods based on the isotope shift is the selective excitation of one of the isotopic species by radiation, particularly laser radiation, tuned to a specific absorption line, followed by a physical or chemical process which acts on excited species and separates them from unexcited ones. A general outline of laser isotope separation processes can be found in C. Bradley Moore, "The Application of Lasers to Isotope Separation" *Accounts of Chemical Research* 6 323 (1973).

Chromatographic methods have been employed over the years the analytical purposes and for the isolation of pure materials. Chromatographic separation methods are based on differences in the partition coefficients and, hence, retention volumes or times, of substances distributed between a static phase, usually of greater surface area, and a moving fluid phase. In gas-solid systems, separation of gaseous substances is based on differences in residence times due to differences in surface adsorption-desorption times.

It is possible to obtain separation of different isotopic species of the same substance by chromatographic methods. For example, a chromatographic separation of HD from $H_2$ on a glass powder adsorbent in a 35-cm by 2-mm I. D. column is described in *Column Chromatography, Fifth International Symposium on Separation Methods*, 1969, page 233, (in German), referenced in *Chemical Abstracts* 76, 53546h, page 538. However, scaling up the described process for commercial operation would require a prohibitively long column, as long as of the order of about 5 kilometers.

SUMMARY OF THE INVENTION

In accordance with the present invention there is provided an isotope separation method wherein an isotopically mixed molecular species is physically absorbed on a suitable adsorptive surface and subjected to irradiation of a selected wavelength to vibrationally excite only a desired isotopic species. Sufficient energy is transferred to the vibrationally excited isotopic species to effect desorption thereof from the surface and thus separate the desired isotopic species from unexcited undesired isotopic species remaining on the surface.

More particularly, the present isotope separation method is directed to the separation of an isotopically mixed molecular species which is normally substantially transparent to infrared radiation but is capable of absorbing infrared radiation when physically adsorbed on an adsorptive surface. The present method is particularly applicable to the separation of hydrogen isotopes.

The term "isotopically mixed molecular species" is used herein to denote a mixture of at least two different isotopic species which represent the ways that isotopes of the same element can combine, with each other or with other elements, to form a substance of a particular chemical formulation, with one of the isotopic species which contains a desired isotope of an element being a "desired isotopic species". A naturally occurring chemical substance contains numerous isotopic species representing all possible ways that the isotopes of the elements making up the chemical substance can combine to form that substance. For example, naturally occurring hydrogen is an isotopically mixed molecular species consisting of isotopic species representing all possible ways that the isotopes of hydrogen, namely, protium ($^1H$ or H), deuterium ($^2H$ or D), and tritium ($^3H$ or T), can combine to form molecular hydrogen. As another example, methane is an isotopically mixed molecular species consisting of numerous isotopic species representing all possible ways that the isotopes of carbon and the isotopes of hydrogen can combine to form $CH_4$. The fraction of each isotopic species present depends on the natural abundance of the particular isotopes comprising that species. Naturally occurring hydrogen consists primarily of the isotopic species $H_2$, HD, and $D_2$. Each of the isotopic species comprising a given isotopically mixed molecular species is a distinct entity having its own unique absorption spectrum.

It is, therefore, an object of this invention to provide a method of separating isotopes which makes use of isotope shift.

More particularly, it is an object of this invention to provide a method of separating isotopes, particularly isotopes of hydrogen, by selective photodesorption from an adsorptive surface, a method termed "photochromatography".

Other objects of the invention will become apparent from the following detailed description made with reference to the accompanying drawing.

BRIEF DESCRIPTION OF THE DRAWING

The accompanying FIGURE represents one suitable means for carrying out the process of the present invention.

DETAILED DESCRIPTION OF THE INVENTION

Broadly, the present invention is directed to a method for separating isotopes, particularly isotopes of hydrogen, by selectively desorbing a desired isotopic species from an adsorbing surface.

Molecules which have an intrinsic electric dipole are able to absorb infrared radiation by resonant coupling of the dipole field with the incident radiation field. In contrast, electrically symmetrical molecules such as hydrogen, methane, ethylene, acetylene, etc., are essentially transparent to infrared radiation since their vibrations do not induce a change in their dipole moment. However, by physically absorbing such molecules on a suitable adsorptive surface, the inherent electrical symmetry of the electron density can be perturbed so as to induce a molecular dipole; the molecules will then absorb the infrared. For example, when hydrogen is physically absorbed on surfaces such as silica gel or porous Vycor glass (a commercially available microporous 98% silica glass), the adsorbed molecules become electrically asymmetrical and a relatively intense infrared absorption band is observed at 4131 cm$^{-1}$. The various isotopic species of hydrogen, such as HD, HT, $D_2$, etc., also absorb in the infrared region when held on an absorbing surface, but their respective absorption frequencies differ from that of the HH species because the differences in molecular mass result in different molecular vibration frequencies.

More specifically, then, in accordance with the present invention, an isotopically mixed molecular species, normally substantially transparent to infrared radiation, is physically adsorbed on a suitable adsorptive surface and is thereby capable of absorbing in the infrared spectrum. The adsorbed molecules are then irradiated with infrared radiation having a wavelength selected to vibrationally excite only molecules of the desired isotopic species. The vibrational energy thus transferred to the molecules of the desired isotopic species is sufficient to overcome the binding forces of adsorption, and these molecules are thus desorbed from the surface and separated from unexcited molecules of undesired isotopic species. Since the isotopic species are separated by an adsorption/desorption process, mediated by infrared photons, the present method is termed photochromatographic isotope separation.

The isotopic separation process of the present invention can be carried out in a manner analogous, in many respects, to conventional gas-solids chromatographic processes. A discrete gaseous sample of the substance to be separated is diluted with an inert carrier gas and flowed through a column packed with a suitable adsorptive solid. The components of the sample appear at the column outlet at different times, with the component desorbing first being the first to appear. By its nature, chromatography is a batch process. For the present isotope separation process certain modifications are required in order to accommodate the irradiation step. First, the column packing must be substantially transparent to the particular wavelength selected for photoexcitation of the desired isotopic species. Additionally, the column must be substantially transparent at the irradiation frequency or be provided with windows for transverse transmission of the radiation beam. In the present state of technology, infrared transparent materials which can provide the structural support required for a column are not readily available. However, the present process can be readily accomplished with a column made of any suitable structural material by providing the column with ports, or windows, which are transparent at the irradiation frequency and by coating the inside walls of the column with a material which is reflective at the irradiation frequency.

A suitable apparatus for carrying out the present process is shown in the accompanying FIGURE. Referring to the FIGURE, the numeral 11 denotes a thermally insulating reflecting wall of a column. The column is provided with ports, or windows, 12 for transverse transmission of the excitation radiation. The windows are composed of a substantially infrared transparent material, for example, sapphire, calcium fluoride, barium fluoride, quartz, or the like. The column is packed with a stack of thin sheets 13 composed of a suitable adsorptive material which is substantially transparent at the irradiation frequency. Suitable infrared transparent materials include porous Vycor glass, pressed alumina gel, and the like. The width of the column used for a particular application depends on the transparency of the column packing, a higher transparency permitting a wider column.

In operation, an isotopically mixed molecular species, in the gaseous state, is diluted with an inert carrier gas such as helium, if necessary, and flowed through the packed column. Alternatively, a pressure gradient, i.e., pumping, can be used to flow the gaseous feed through the column. The molecules of the mixed molecular species adsorb on the packing material. The adsorbed molecules are then subjected to infrared radiation of a predetermined wavelength which will excite the adsorbed molecules of the desired isotopic species without substantially exciting adsorbed molecules of the undesired isotopic species. Sufficient vibrational energy is transferred to the selectively excited molecules to overcome the binding forces of adsorption. Thus, molecules of the desired isotopic species desorb first and appear first at the column exit. Molecules of the undesired isotopic species desorb, at a later time, as a consequence of natural desorption with time. The exit stream is monitored in order to determine the point of separation, that is, the point between desorption of desired isotopic species and desorption of undesired isotopic species. A suitable monitoring device which can be employed is a thermal conductivity bridge which measures the heat capacity of the gas as it flows past a detector. The thermocouple portion of this device is used to read the temperature of the exit gas; different isotopic species will give different temperature readings. Alternatively, direct analysis can be provided by flowing a small sample of the exit gas through a discharge tube and observing its emission spectra. Thus, the exit gas can be separated into two fractions: a "heads" fraction enriched in the desired isotopic species and a "tails" fraction depleted in the desired isotopic species. The degree of enrichment is dependent upon the length of the column and upon the intensity of irradiation. The well known technique of cascading, that is, subjecting the heads and tails fractions, separately, to additional photochromatographic separation stages, is equivalent to using a longer column. Thus, by coordinating column length with number of separative units, any desired degree of enrichment can be obtained.

The optimum operating temperature is determined by both the molecular species to be adsorbed and the adsorptive surface material. For the adsorption of hydrogen, the most effective operating temperature is below about 225° K, preferably on the order of liquid nitrogen temperature (approximately 78° K).

Any infrared irradiation source can be used in the present process provided it is of the proper wavelength region and electrical efficiency. Suitable irradiation sources are frequency tunable lasers, particularly a frequency doubled CO laser or an HF laser. Alternatively, a black body source, if sufficiently large, can be used. For example, in the case of hydrogen isotope separation, because of the large mass difference between HD and $H_2$, the shift in vibration adsorption frequencies is large, about 1000 cm$^{-1}$. Thus, the infrared radiation need not necessarily be supplied by a laser source; a high-grade quartz projection lamp centered at 3600 cm$^{-1}$ (corresponding to the vibration frequency of the adsorbed HD species) followed by a narrow band pass filter of ±100 cm$^{-1}$, can be used.

The irradiation frequency used in present process is preselected on the basis of the optical spectra of the various isotopic species which comprise the given isotopically mixed molecular species. Such data, if not available in standard references, is readily obtainable by experiment.

EXAMPLE

Consider now, for illustrative purposes, the separation of HD from $H_2$. In common with all chromatographic processes, the apparatus is operated in a pulsed or batch mode. A plug volume of entrance gas (a mixture of $H_2$ and HD) in a stream of helium carrier gas is first cooled to liquid nitrogen temperature (78° K) to narrow the HD absorption line. The mixture of cooled gases is then flowed through a stack of thin (0.1 mm) sheet of porous Vycor glass sandwiched between thermally insulating walls which are reflective at the irradiation frequency, in this case 3600 $cm^{-1}$. Gas flow direction is parallel to the sheets of porous glass so that the gas flows between the sheets of the stack. After the plug volume of gas has adsorbed on the surface of the glass sheets, the column is subjected to laser radiation in the 3600 $cm^{-1}$ spectral region. Irradiation of the adsorbed gases with 3600 $cm^{-1}$ infrared radiation introduces about 10 Kcal/mole of vibrational energy into only the adsorbed HD molecules since 3600 $cm^{-1}$ corresponds to a vibration frequency of the adsorbed HD species. The energy of binding (adsorption) on glass is on the order of 2 Kcal/mole; thus the additional 10 Kcal/mole of vibrational energy easily desorbs HD molecules from the glass. The desorbed HD molecules are swept out of the column by the stream of helium carrier gas. The $H_2$ molecules adsorbed on the glass surface do not absorb 3600 $cm^{-1}$ and remain bound on the glass for a longer time. Thus, the present separates the $H_2$/HD mixture into two fractions with the HD fraction leaving the stack first. The $H_2$ fraction desorbs at a later time due to the natural desorption of $H_2$ with time and exits the column in the carrier gas stream. At 78° K and one atmosphere $H_2$ pressure, about 20% of the porous glass surface is covered with an adsorbed molecular monolayer. Porous glass has a surface area of 200 $m^2$/gm and an average pore size of 40 A. If 25 $A^2$ is allowed for each $H_2$ molecule adsorbed, then about $3 \times 10^{-4}$ moles of $H_2$ is adsorbed per gram of glass. Therefore, for every kilogram of glass, about one milligram of HD is separated per pulse of operation. For a full scale plant using a metric ton of glass and assuming a 5 minute cycle time, 300 grams of HD could be expected to be produced per day. Preliminary calculations indicate a total operating cost of substantially below $1.00 per mole of $D_2O$; the current operating cost for producing $D_2O$ is $1.50 per mole.

It has been found that photoinduced desorption of a desired isotopic species increases the residence time differential between desired species and undesired species by orders of magnitude over conventional chromatograhic processes. Experimental results obtained as hereinafter described provide a basis for comparision of the photochromatographic separation process of the present invention with conventional chromatographic separation processes.

Experiments were carried out demonstrating the photochromatographic separation of deuterium. The apparatus used for the experimental separation consisted of a dewared low temperature (liquid nitrogen) container which had two sets of double 1 inch sapphire windows sealed into ports in the dewar 180° apart. A sample of porous Vycor glass, prepared as hereinafter described, was placed in a copper holder through which liquid nitrogen was flowed. The copper holder was also the source of cooling for the hydrogen gas introduced into the dewar. The transparency of the sapphire windows was >90% in the region 4000 to 3000 $cm^{-1}$. The light source used for irradiation of the cell was a 500W quartz iodide movie camera spot light and a narrow pass IR filter with half height width from 3659 to 3467 $cm^{-1}$ with >75% transmission at 3600 $cm^{-1}$. The output of the lamp through the filter at 10 inches from lamp filament, through a ¾ inch aperture, was 28 mW.

The porous Vycor glass was cut to a $1 \times 3 \times ¼$ size and weighed ~ 30 g. At liquid nitrogen temperatures ~ 30 mg of $H_2$ will adsorb at 100 Torr $H_2$ pressure. The glass was conditioned by heating to 400° C in 600 torr $O_2$ for several hours to remove adsorbed organics, followed by > 10 hours at 700° –750° C under a vacuum of $<8 \times 10^{-6}$ torr to remove adsorbed $H_2O$. Afer such conditioning the ¼ inch thick glass showed reasonable transparency (~10%) at 3600 $cm^{-1}$. Transfer of the glass from the vacuum furnace tube to the low temperature irradiation cell was done rapidly (~ 1 min), and the glass was maintained under a vacuum of $3 \times 10^{-6}$ torr for several hours after transfer.

Deuterium analysis was accomplished using a monochromator to record the Balmer excitation spectra of H and D at 486.13 nm and 486.00 nm, respectively, using the third order dispersion. Excitation was accomplished in a small sample cell (volume ~2 ml) through tungsten electrodes and a D.C. voltage source at 1.6 KV. This analysis yields the total deuterium to total hydrogen gas $$\left( \text{i.e.} \frac{D}{H+D} \right).$$

The hydrogen-deuterium samples for isotopic separation runs were prepared by the mixing of ≈ 1 atm pressure each of $H_2$ and $D_2$ over finely divided platinum in a small stainless steel pipe fitting (volume =15 ml). After a few minutes, the resulting randomized HD-$D_2$-$H_2$ mixture (due to the scrambling of H and D atoms over Pt) was expanded into the irradiation cell (volume ≈ 1.5 l) and this was slowly evacuated to 6 torr total pressure.

A steady state experiment demonstrated large deuterium isotopic enrichment. Before irradiation, aliquots of the gas above the porous glass were removed into the evacuated cell, both before and after cooling. The initial $$\frac{D}{H+D}$$

was 21 mol% ±2%. After cooling the previously described gas mixture and glass to 120° K, the glass was irradiated for 120 minutes. After irradiation, the deuterium content of the gas in the irradiation cell was 51 mol%.

The control was run using a new sample of gas prepared over platinum using ~10 psi (absolute) $D_2$ and overpressured with ~20 psi (absolute) $H_2$. This yielded a gas mixture of 34% D content. The gas was allowed to stand in the irradiation cell for 7 hours at room temperature; no change in %D was observed. The irradiation cell gas was cooled to 120° K without irradiation and aliquots were taken after 30 and 60 minutes; no change was observed in the deuterium concentration.

The above experimental results clearly demonstrate the outstanding results obtained with photoinduced desorption (photochromatographic separation) as compared with natural desorption (conventional chromatographic separation).

Although the present process has been described specifically with respect to the separation of hydrogen isotopes, photochromatographic separation can be applied to the separation of other isotopes. For example, carbon or oxygen isotopes can be separated by photochromatography by using carbon dioxide as the starting material. Also, oxygen isotopes can be separated from naturally occurring molecular oxygen by means of the present process. As mentioned above, a molecular dipole can be induced by adsorption in methane, ethylene, acetylene, and other symmetrical molecules, as well as in hydrogen. Thus, isotopically mixed species of the foregoing hydrocarbons can provide systems for the separation of carbon isotopes as well as hydrogen isotopes.

Gas chromatography has particularly close affinities with ion exchange methods, distillation and countercurrent extraction. In particular, the theory of chromatography and distillation are very similar. Distillation differs from chromatography in that both phases are moving and the surface area that one phase exposes to the other is not great in the chromatographic sense. Nevertheless, it is possible to extend the concept of photoinduced partition to these other separation techniques. For example, liquid methane can be refluxed through a cooled distillation column of porous glass while simultaneously irradiating the reflux column with infrared radiation corresponding to an appropriate $CH_3D$ absorption frequency. In this manner, only $CH_3D$ would distil over while the undesired isotopic species would recondense into the distillation vessel.

Although the invention has been described with reference to specific examples and preferred embodiments, various modifications and changes will be apparent to those skilled in the art, all of which may be achieved without departing from the spirit and scope of the invention as defined by the following claims.

What I claim is:
1. A method for isotope separation which comprises:
    a. physically adsorbing on an adsorptive surface an isotopically mixed molecular species consisting of a desired isotopic species and at least one undesired isotopic species.
    b. irradiating the adsorbed isotopically mixed molecular species with radiation of a predetermined wavelength which will excite the adsorbed desired isotopic species without substantially exciting adsorbed undesired isotopic species, thereby desorbing the desired isotopic species to produce a fraction enriched in the desired isotopic species and a fraction depleted in the desired isotopic species, and
    c. separating the fraction enriched in the desired isotopic species from the fraction depleted in the desired isotopic species.
2. A method according to claim 1 wherein the radiation source is a laser source.
3. A method according to claim 1 wherein the radiation is infrared radiation.
4. A method according to claim 3 wherein the isotopically mixed molecular species is hydrogen.
5. A method according to claim 4 wherein the desired isotopic species is HD and the predetermined wavelength in the 3600 $cm^{-1}$ spectral region.
6. A method according to claim 4 wherein the process is conducted at a temperature of less than about 225° K.
7. A method according to claim 1 wherein the adsorptive surface is a porous silica glass.
8. A method according to claim 1 wherein the adsorption step is accomplished by flowing a gaseous mixture comprising an inert carrier gas and the isotopically mixed molecular species through a column containing a solid material characterized by an adsorptive surface and transparency to the predetermined wavelength of radiation.

* * * * *